(12) United States Patent
Brunet et al.

(10) Patent No.: US 7,784,284 B2
(45) Date of Patent: Aug. 31, 2010

(54) EXHAUST ASSEMBLY FORMING A HORIZONTAL PROPULSION GAS ELBOW IN AN AIRCRAFT

(75) Inventors: Edgar Brunet, Neuilly sur Seine (FR); Thomas Daris, Paris (FR); Alain Pierre Page, Montgeron (FR); Jackie Raymond Julien Prouteau, Villecresnes (FR)

(73) Assignee: SNECMA, Paris (FR)

( * ) Notice: Subject to any disclaimer, the term of this patent is extended or adjusted under 35 U.S.C. 154(b) by 546 days.

(21) Appl. No.: 11/741,338

(22) Filed: Apr. 27, 2007

(65) Prior Publication Data

US 2007/0266712 A1 Nov. 22, 2007

(30) Foreign Application Priority Data

Apr. 28, 2006 (FR) ..................... 06 51543

(51) Int. Cl.
*F02K 1/00* (2006.01)
(52) U.S. Cl. ............................ 60/770; 60/39.5; 60/229; 181/213; 239/265.11; 239/265.17
(58) Field of Classification Search .................. 60/39.5, 60/770, 229; 239/265.11, 265.17; 181/213
See application file for complete search history.

(56) References Cited

U.S. PATENT DOCUMENTS

| 3,210,934 | A | * | 10/1965 | Smale | ........................ 60/265 |
| 3,981,448 | A | | 9/1976 | Demogenes et al. | |
| 4,215,537 | A | | 8/1980 | Hurley et al. | |
| 4,864,819 | A | * | 9/1989 | Steyer | ........................ 60/264 |
| 5,170,964 | A | * | 12/1992 | Enderle et al. | ................. 244/52 |
| 5,404,713 | A | * | 4/1995 | Johnson | ....................... 60/204 |
| 5,699,662 | A | | 12/1997 | Born et al. | |
| 5,746,047 | A | * | 5/1998 | Steyer et al. | .................. 60/39.5 |
| 6,112,513 | A | | 9/2000 | Catt et al. | |
| 2002/0189232 | A1 | | 12/2002 | Weiland et al. | |

FOREIGN PATENT DOCUMENTS

GB 2 044 359 A 10/1980

OTHER PUBLICATIONS

U.S. Appl. No. 11/741,346, filed Apr. 27, 2007, Brunet, et al.
U.S. Appl. No. 11/741,393, filed Apr. 27, 2007, Daris, et al.

* cited by examiner

*Primary Examiner*—Michael Cuff
*Assistant Examiner*—Craig Kim
(74) *Attorney, Agent, or Firm*—Oblon, Spivak, McClelland, Maier & Neustadt, L.L.P.

(57) ABSTRACT

A propulsion gas exhaust assembly in an aircraft propelled by hot gases produced along the axis of the latter by a gas generator is disclosed. The exhaust assembly includes a duct which forms a vertical elbow and a nozzle.

18 Claims, 4 Drawing Sheets

EXHAUST ASSEMBLY FORMING A HORIZONTAL PROPULSION GAS ELBOW IN AN AIRCRAFT

The invention relates to the field of aircraft propulsion by ejection of gas flows, and relates to the exhaust assembly downstream of the gas generator up to the nozzle.

BACKGROUND OF THE INVENTION

For aircraft propelled by turbojets, with or without pilot, drones, for military applications, one objective is stealth.

Stealth is defined in particular in relation to two parameters: the radar cross section (RCS) and the infrared signature (IRS). The RCS is the surface area likely to appear on a radar, taking account of the geometry of the aircraft. The IRS is the heat signature that the aircraft leaves, particularly at its ejection nozzles.

DESCRIPTION OF THE PRIOR ART

To reduce this heat signature, or even delete it, it is a known practice to mask the infrared radiation emitted by the hot gases exiting the gas generator. For example U.S. Pat. No. 3,693,880 is known that describes a device of this type. It comprises a screen in the shape of a body of revolution placed in the gas exhaust channel while being at a distance from the walls of the latter and held by radial arms. It has an aerodynamic shape guiding the gases in the best way possible along its ovoid profile and its surface is cooled by the colder air carried by the radial arms. The cylindrical duct becomes annular between the screen and the wall of the duct. The flow again becomes cylindrical downstream of the screen to be exhausted through a nozzle. The diameter of the duct becomes larger at this location and follows an axial profile parallel to that of the screen to conserve a sufficient opening. The maximum diameter of the screen is sufficient to mask the turbine from view from the rear. In addition the downstream portion of the screen has a double wall traversed by the cooling air in order to prevent any heating thereof.

The present applicant has furthermore developed a double nozzle, called a bifid nozzle, in which the gas flow exiting from the gas generation means is divided into two flows and guided to two nozzles. The two flows of equal size are ejected in parallel in the axis of the thrust. The advantage of this arrangement is to allow the guidance of the aircraft, particularly in yaw by a control of the two flows either by orientation of their thrust vector or by the delivery rates. Being separated from one another, they are also offset from the axis of the generator. In this manner, in the case where the gas generator means comprises a turbine, the latter is capable of being invisible from the rear through the opening of the nozzles. The infrared signature is therefore small.

SUMMARY OF THE INVENTION

The subject of the present invention is an exhaust device whose infrared signature is further reduced relative to the former solution.

The invention succeeds in achieving this objective with a propulsion gas exhaust assembly, in an aircraft propelled by hot gases produced along the axis of the latter by a gas generator, particularly a gas turbine engine, comprising a duct and a nozzle, wherein said duct forms a vertical elbow defined by a first portion guiding the gas flow in a radial direction of the vertical plane away from the axis of the aircraft and a second portion downstream of the first portion guiding the gas flow in a radial direction toward said axis, downstream of the elbow the gas flow being returned to the axis and in which the axis of the nozzle is parallel, particularly coaxial, to the axis of the gas flow exiting from the gas generator, the elements of the duct upstream of the elbow not being visible from the rear.

In the present application, the term "elbow" is understood in the following manner. The duct comprises a first portion guiding the gas flow in a radial direction away from the axis and a second portion downstream of the first, guiding the gas flow in a radial direction toward the axis. Downstream of the elbow, the flow is returned to the axis.

Advantageously, the axis of the nozzle is parallel, preferably coaxial, to that of the gas flow exiting from the gas generator.

According to an advantageous embodiment, the cross section of the duct over a portion of its length is elongate in shape in the crosswise direction.

More particularly, the duct comprises a transverse entrance plane and the nozzle a throat plane that is distant from the entrance plane by a length $L_{channel}$, and the transverse plane of the elbow, at the maximum vertical deviation is situated at a distance from the entrance plane $L_{elbow}$ such that the ratio $L_{elbow}/L_{channel}$ lies between 0.5 and 0.7; and/or the height $H_{int}$ of the internal wall and the height $H_{ext}$ of the external wall of the elbow relative to the axis of the gas flow, corresponding to the level of maximum vertical deviation, are in a ratio $H_{int}/H_{ext} <= 1/2$. According to another feature, the ratio $H_{ext}/L_{channel}$ is approximately $1/3$.

Surprisingly, it has been found that by vertically bending the gas flow up or down in this manner it was possible to effectively mask not only the disk of the turbine but also the hottest portions downstream of the latter. Furthermore, this concept also makes it possible to design a duct geometry minimizing the aerodynamic pressure drops load while favoring the mixture of the gases before ejection.

The masking to the infrared radiation is further improved by dividing the flow into two flows transversely apart from one another. Thus, according to another feature, the duct comprises a transition zone element communicating in the downstream direction with two duct elements each opening into a half-nozzle.

The invention also relates to the guidance capability supplied by this latter type of exhaust. The solution described in the patent application filed by the present applicant under number FR 0551857 has been applied. Specifically, in the case of a nozzle as intended to be fitted to a military drone, an objective of IRS and RCS stealth is linked with the need for vectored thrust. This leads to designing very flat two-dimensional nozzles, with an elongation of the order of 5 for IRS and RCS stealth and with a pointed external shape for RCS stealth.

A further object of the present invention is the production of an aircraft controlling device, particularly for controlling an aircraft in yaw, that is effective and associated with a control of the engine delivery rate.

This device must be applicable to single-engined or twin-engined aircraft and in particular to drones.

This device must be capable of continuously providing a low amplitude vectorization without causing a gas generator performance penalty.

It must be capable of providing a major vectored thrust for the needs of controlling the aircraft.

It must be capable of limiting the IRS in the rear and sideways sector.

Thus, according to another feature, the exhaust assembly is shaped so as to divide the main propulsion gas flow into a first and a second flow for an ejection into a first and a second half-nozzle and comprises at least one of the following two controlling means: a means of distributing the main flow into each of the two half-nozzles and a means of orienting the thrust vector produced by each of the two half-nozzles.

"Half-nozzle" means, in the present application, a gas ejection nozzle that receives a portion of the main flow downstream of the turbine. This term is not associated with a particular shape. Use is made of the two-flow solution to separately control the two half-thrust vectors in modulus and in orientation.

Advantageously, at least one of said two means, preferably both, use fluid injection and still preferably the exhaust assembly comprises said two means. This solution has the advantage of being simple and of operating with a reduced number of fluid injection devices, ensuring a high reliability and low cost. However, the means of controlling the two flows may be mechanical.

According to a particular embodiment, the main flow is generated by two gas generators, and comprises a means of orienting the thrust vector produced by each of the two half-nozzles.

In the first place, said half-nozzles are placed for a yaw orientation of the thrust vector. In this way the absence of a vertical stabilizer is alleviated.

According to one variant, said half-nozzles are placed for a pitch or roll control or else the nozzle comprises two pairs of half-nozzles, for example one for the yaw orientation, the other for the pitch orientation. Other arrangements or combinations are possible.

According to another feature, the means for controlling the distribution of the flows comprises means for fluid injection at the throat of each of the half-nozzles. More precisely, the gas generator being a turbojet, the fluid injection means are supplied by the air that can be tapped from the compressor of the generator. This solution is particularly advantageous because it allows a balanced operation in all the flight phases. Particularly, a nozzle operation procedure is planned according to which the air is continuously tapped from the generator compressor.

According to a variant embodiment, the main flow is generated by two gas generators. In this case, the exhaust assembly preferably comprises only one means of orienting the thrust vector produced by each of the two half-nozzles.

BRIEF DESCRIPTION OF THE DRAWINGS

The invention is now described in greater detail with reference to the appended drawings in which

FIGS. 4 to 6 show the assembly of FIG. 3 seen respectively from above, from behind and in rear three-quarter perspective;

DESCRIPTION OF THE PREFERRED EMBODIMENTS

Figure 1:
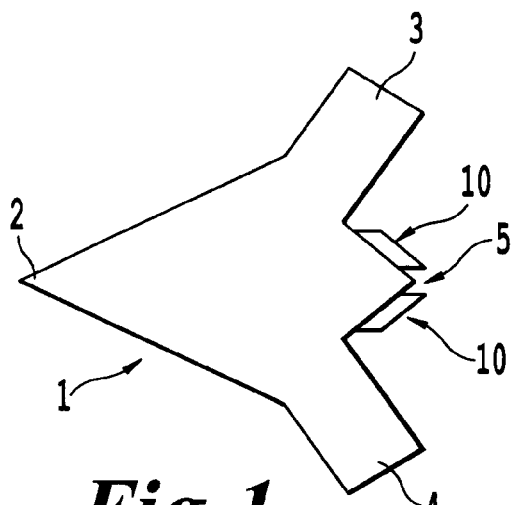
FIG. 1 shows in a top view an example of an aircraft to which the invention is applied.
Figure 2:
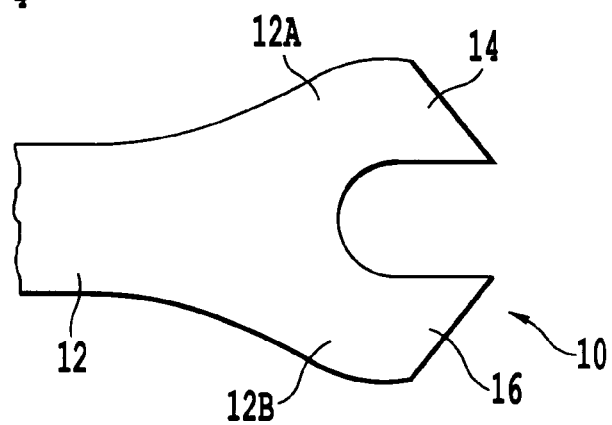
FIG. 2 shows in a top view a nozzle of the bifid type as described in application FR 05 51 857.

The aircraft 1 represented in the figure is a nonlimiting example. It has a nose 2, two wings 3 and 4 and is propelled by one or two turbojets that are not visible. It is shaped so as to have the smallest possible RCS and IRS. Its rear portion in particular has no vertical stabilizer and terminates in a point 5 with an appropriate apex angle, for example 40°, to reject the radar waves to infinity. The exhaust assembly 10 participates in this requirement by being bifid. It distributes the main flow exiting the channel 12 at the entrance into two flows in two symmetrical channels 12A and 12B that terminate in two half-nozzles 14 and 16 of rectangular section. The channels 12, 12A and 12B have a shape suitable for ensuring the separation of the flow into two flows but also the transition from a circular or substantially circular section cylindrical shape to a rectangular section shape.

According to the present application, the shape of the exhaust assembly is enhanced so as to ensure the masking of the turbine block irrespective of the position of a rear observer.

With reference to FIGS. 3 to 6, the geometry of the exhaust assembly 20 according to the invention can be seen.

This assembly comprises a duct 21 with an entrance tubular element 21A, on the side of the gas generator, and connected to a nozzle 24. The axis XX of the nozzle is that of the gas flow exiting the turbine.

Figure 11:
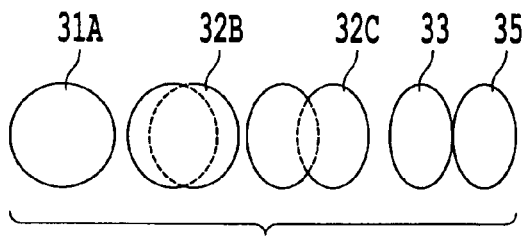
FIG. 11 shows the various shapes of the cross section of the transition duct element moving along the axis in the downstream direction.
Figure 7:
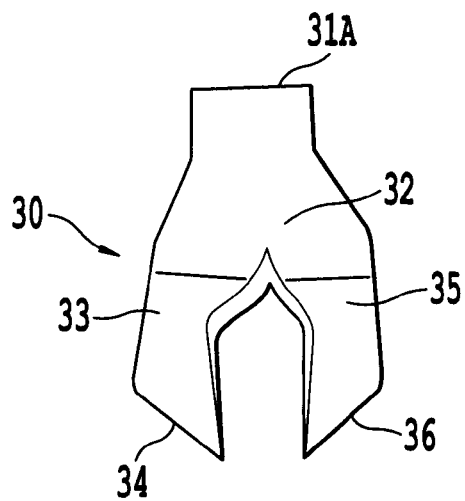
FIG. 7 shows in a top view an exhaust assembly according to a second embodiment of the invention.

The entrance tubular element 21A is in direct communication with the outlet of the engine turbine. As can be seen in FIG. 11, its section is preferably circular. It may however be different.

Moving axially downstream relative to the gas flow, the duct forms an elbow. The duct deviates from the axis in the vertical direction, here downwards, and diverts the gas flow radially toward the outside up to a maximum deviation relative to the axis at 21M where the flow becomes axial. It then moves closer to the axis by deviating the flow radially toward the axis up to 21N where it is returned to the axis XX. The duct terminates in the divergent nozzle 24 downstream of the throat that is situated in this example at the plane 21N. Here it has a rectangular section, but other shapes are possible. According to the embodiment illustrated, the nozzle comprises two horizontal walls parallel with one another each forming a point. This type of exhaust is suitable for incorporation into an aircraft such as that shown in FIG. 1 aimed at RCS stealth and IRS stealth via the elbow of the duct.

The shape of the duct changes from the entrance plane in the downstream direction progressively by widening in the crosswise direction while reducing in height up to the low level of the elbow that is the section furthest away transversely from the axis. Then the shape of the cross section of the duct 21 changes progressively in the downstream direction until it has the shape of the nozzle. The areas are determined according to the requirements of the fluid dynamics.

Preferably, the assembly has at least one of the following dimensional relations:

$L_{elbow}/L_{channel}$ lies between 0.5 and 0.7;

$H_{int}/H_{ext} \geq 1/2$;

$H_{ext}/L_{channel} = 1/3$ approximately;

The $H_{int}/L_{channel}$ ratio is deduced from this; it is close to ⅙;

where $L_{elbow}$ is the length measured axially in the downstream direction from the entrance plane of the tubular element 21A to the level 21M where the elbow reaches the maximum vertical deviation;

$L_{channel}$ is the length measured axially in the downstream direction from the entrance plane of the tubular element 21A to the throat of the nozzle at level 21N;

$H_{int}$ is the height of the elbow measured transversely from the axis XX to the internal wall of the duct 21, at the level 21M where the elbow reaches the maximum vertical deviation;

$H_{ext}$ is the height of the elbow measured transversely from the axis XX to the external wall of the duct 21, at the level 21M where the elbow reaches the maximum vertical deviation.

As illustrated by the straight line D1, such a geometry makes it possible to effectively mask the hot zones of the engine. The straight line D1 constitutes one of the limits of visibility of the hot zones.

A description is now given of the variant that is illustrated in FIGS. 7 to 10. According to this embodiment, the formation of a vertical elbow according to the invention is combined with the division of the flow into two distinct flows in an exhaust assembly of the bifid type.

The duct of the exhaust assembly 30 comprises a first cylindrical duct element 31 with an entrance plane 31A of the gases exiting the gas generator. This first duct element 31 is in the axis of the gas flow and is of cross section, particularly circular, connecting to the gas generator that is not shown. Downstream, the duct element 31 is extended by a second duct element 32. The cross section of this element 32 changes progressively from the circular shape of the element 31 to a shape that is transversely elongate and of reduced height, with a beginning of separation into two channels. Advantageously, this beginning of separation takes the contour of two identical ellipses that overlap and whose major axis is horizontal in the same plane. The two ellipses separate progressively from one another as can be seen at 32B and 32C of FIG. 11. At the end of transition, there are two distinct third duct elements 33 and 35 with sections in this instance of elliptical shape. The two duct elements 33 and 35 each open into a half-nozzle 34, 36 respectively. These two half-nozzles are in one and the same horizontal plane, at the same level as the axis of the entrance section 31A. Their deviation in the horizontal plane is for example of the order of the diameter of the entrance section 31A. The two half-nozzles have, in this embodiment, a section of rectangular shape. The section of the two duct elements 33 and 35 changes from the elliptical shape of FIG. 11 to that of the nozzles, still conserving areas determined by the constraints of the fluid dynamics. The two half-nozzles have a downstream bevel shape with the top wall and the bottom wall parallel with one another, an internal wall, close to the axis XX, longer than the external vertical wall. The two vertical walls form a divergence.

Figure 8:
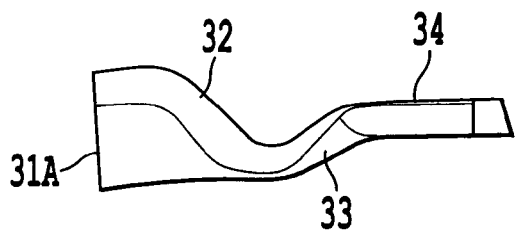
FIGS. 8 to 10 show the assembly of FIG. 7 seen respectively in profile, from the rear and in rear three-quarter perspective.
Figure 9:
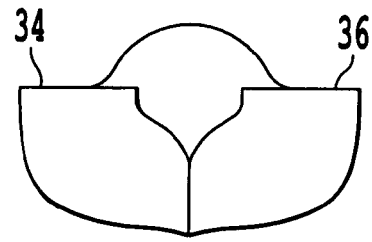
Figure 10:
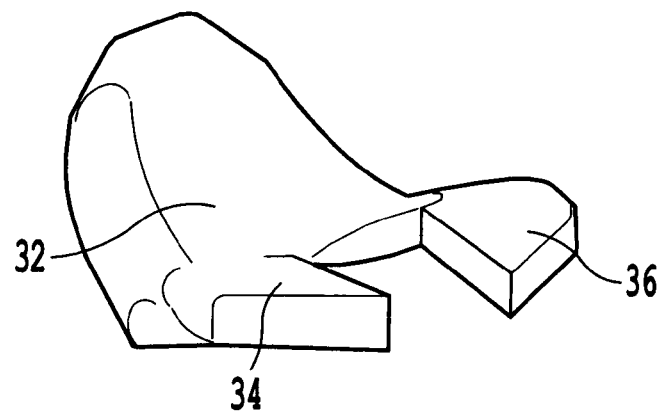

The portion of the exhaust assembly constituted by the second duct element 32 and the two third duct elements 33 and 35 forms an elbow which, seen in profile, is advantageously defined by the same parameters as the first embodiment above. The profile of the assembly 30 represented in FIG. 8 is the same as that of the assembly 30 represented in FIG. 3. The section of this portion at the maximum transverse deviation relative to the axis of the gas flow is situated either in the second duct element 32, of transition, or in the two third duct elements 33 and 35.

Figure 13:
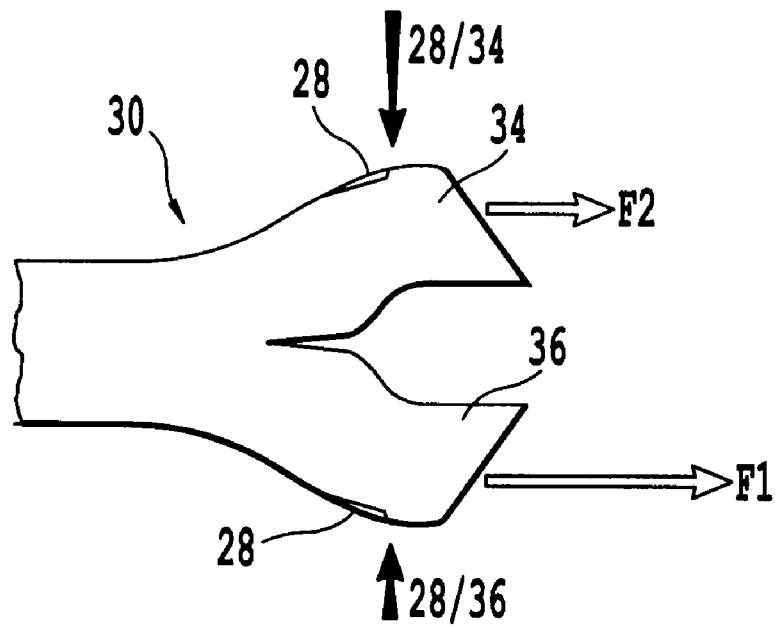
FIG. 13 illustrates the operation of the control means placed at the throat.
Figure 14:
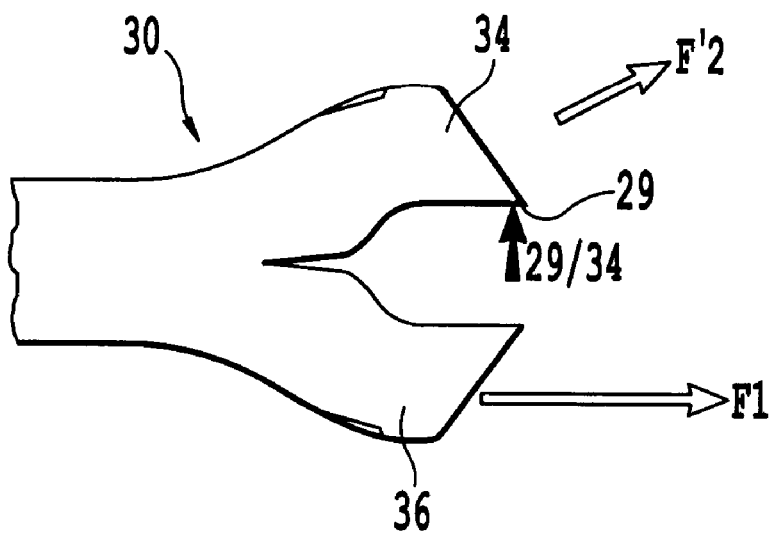
FIG. 14 illustrates the operation of the control means placed in the divergence of the half-nozzles.

The means of yaw guidance of the aircraft will now be described with reference to FIGS. 12, 13 and 14. In this example, each of the half-nozzles consists of a rectangular throat, 34C and 36C respectively, with a high horizontal elongation, width/height ratio. The elongation of the nozzles may be 2.5. Downstream of the throat, the divergence is formed by two vertical walls. It is short on the external side $34D^E$ ($36D^E$ not shown). The vertical walls on the internal side $34D^I$ ($36D^I$ not shown) are longer. This gives a beveled shape of the downstream edge of the nozzles, 34 and 36. The top and bottom walls are either parallel with one another or divergent.

The assembly is preferably optimized to provide, in the cases with no injection and no vectorization, a minimum transverse thrust of each half-nozzle. Specifically, the latter results in a loss of axial thrust that must be reduced to a minimum. The overall lateral thrust remains zero because of the symmetry of the system.

According to a feature of the invention, to provide the guidance of the aircraft 1 without a tail unit, control means are provided by which action is taken on the two flows. These control means may be mechanical or fluidic. In this example, they are fluid.

Figure 12:
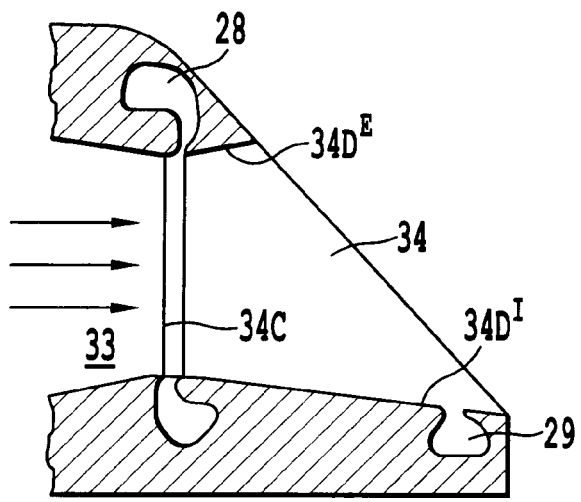
FIG. 12 is a schematic representation of the arrangement of the control means of the invention in a half-nozzle.
Figure 3:
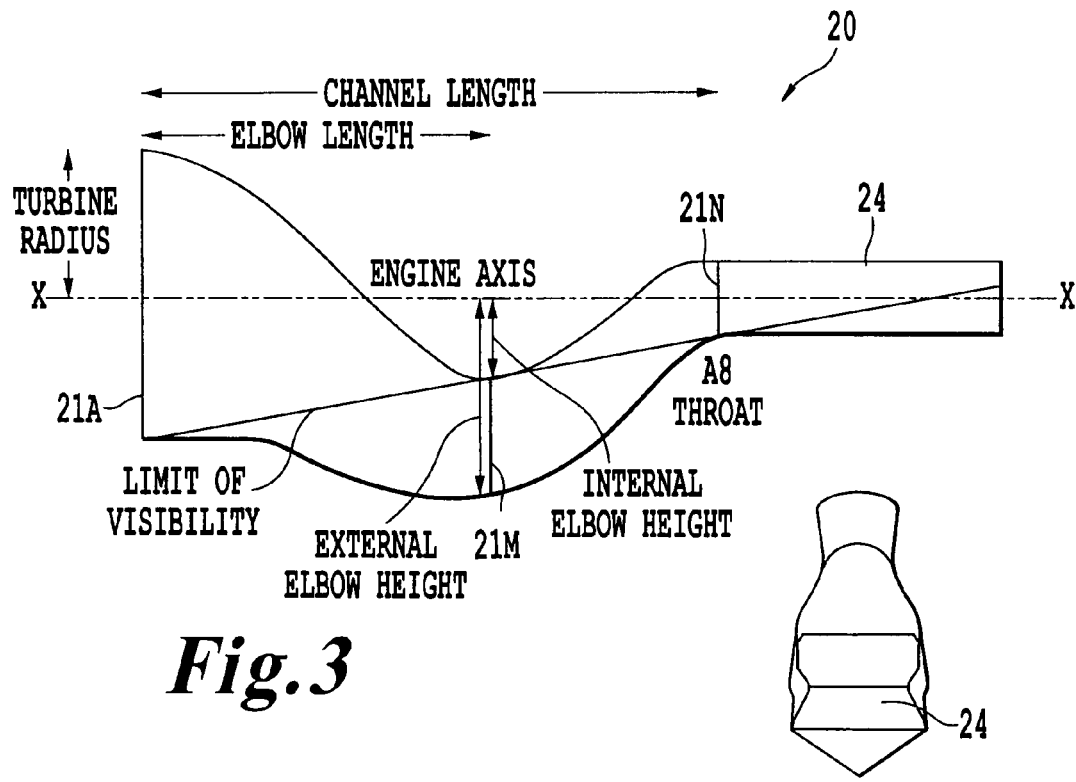
FIG. 3 shows, in a side view, an exhaust assembly according to a first embodiment of the invention.
Figure 5:
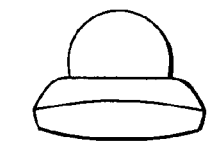
Figure 6:
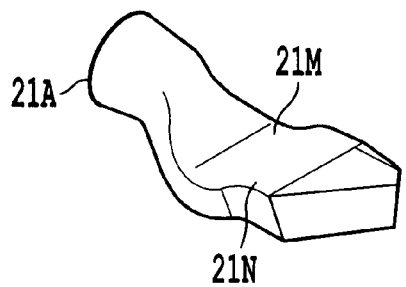

The convergent-divergent nozzle 34 of FIG. 12 comprises the throat 34C and downstream the two divergent walls $34D^I$ and $34D^E$. Here the nozzle comprises a fluid injector 28 placed on a wall at the throat and a fluid injector 29 situated on the wall $34D^I$ of the divergence. The injector 29 is preferably situated close to the end of the divergence.

In a symmetrical manner, the half-nozzle 36 is fitted with a fluid injector 28 at the throat 36C and a fluid injector 29 on the wall of divergence $36D^I$.

The injectors 28 and 29 are advantageously supplied with air tapped from the turbojet compressor that supplies the main flow, as appropriate.

Operation is as follows. FIG. 13 shows by arrows 28/34 and 28/36 the air injections via the injectors 28. The yaw moment is created by controlling the distribution of the delivery rate in each of the two half-nozzles 34 and 36 by means of fluid injections at the two throats. The value of the delivery rate is illustrated by the length of the arrow, and here one arrow is longer than the other. According to this example, the half-nozzle 34 receives a strong injected delivery rate 28/34, and consequently sustains a major restriction of the effective section at the throat. Conversely, the half-nozzle 36 receives little or no delivery rate at the throat. The result of this is the creation of an axial thrust differential. The thrust F1 on the half-nozzle 36 is greater than the thrust F2 on the half-nozzle 34. The result of this is a yaw moment.

It is observed however that a sudden obstruction of the nozzle would instantaneously create an increase in pressure in the channel and a risk of pumping the compressor. According to a preferred operating mode, a nominal permanent injection is created. This is done at equal delivery rate tapped off in such a way that the generator does not undergo a sudden variation during the mission while regulating the nozzle at total equal effective section at the throat. The thermodynamic cycle of the engine is directly optimized under this constraint of constant tapping. In this manner, the system of regulating the tapped air operates continuously and does not undergo any transitional startup phase.

Therefore this operating mode provides, with a low impact on the performance of the engine, a vectored thrust that makes it possible to compensate for the absence of cell tail unit, particularly for cruising or slow transitional speeds.

The operation of the injection device situated in the divergence of the nozzles 34 and 36 is now described with reference to FIG. 14.

The injectors 29, in this embodiment, are preferably placed at the end of the long wall of divergence. By injecting a fluid into the nozzle 34, the direction of which is represented by the arrow 29/34, a deviation of the thrust vector produced by the nozzle and shown by the arrow F'2 is induced. The thrust F'1 provided by the half-nozzle 36 remains axial since nothing disrupts its direction. This results in the creation of a yaw moment relative to the center of gravity of the aircraft. This operating mode provides a substantial vectored thrust to control the aircraft, to the detriment however of the performance of the generator. This deterioration is however controlled.

One embodiment of the invention has been described. However, many variants are possible without departing from the context of the invention. For example, a channel has been shown supplied by a single gas generator. In the case of a twin-engined aircraft, the two half-flows of exhaust are generated by two distinct engines whose regulation is synchronized. Preferably, only the injectors in the divergence are used.

Variants of the arrangement and operation of the control means comprise the presence of a single control means. It is possible to operate it at the same time as the other means or separately.

According to an embodiment not shown, the nozzles may be of the fluid type with ejector, that is to say a secondary flow emerging in or downstream of the main channel.

The control means according to the invention may be combined partly with mechanical means of orienting the flows.

The invention claimed is:

1. A propulsion gas exhaust assembly, in an aircraft propelled by hot gases produced by a gas generator along a center axis of the gas generator, comprising:
   a duct; and
   a nozzle,
   wherein the center axis of the gas generator passes through an inlet of the duct and the nozzle,
   wherein said duct includes a vertical elbow defined by a first portion which guides the gas flow in a radial direction away from the axis of the gas generator and a second portion downstream of the first portion which guides the gas flow in a radial direction toward the center axis of the gas generator, downstream of the elbow the gas flow being returned to the center axis of the gas generator,
   wherein the axis of the nozzle is parallel and coaxial to the axis of the gas generator and the axis of the inlet of the duct, and
   wherein elements disposed inside the duct upstream of the elbow are not visible when the assembly is viewed directly into the nozzle.

2. The assembly as claimed in claim 1, wherein the gas generator is a turbojet.

3. The assembly as claimed in claim 1, wherein a cross section of the duct is elongate in shape in the crosswise direction.

4. The assembly as claimed in claim 1, wherein the duct comprises an entrance plane and the nozzle comprises a throat plane, the distance between the entrance plane and the throat plane is a length $L_{channel}$, and a plane of the elbow, corresponding to a maximum vertical deviation of the elbow from the center axis of the gas generator, is situated at a distance from the entrance plane $L_{elbow}$ such that the ratio $L_{elbow}/L_{channel}$ lies between 0.5 and 0.7.

5. The assembly as claimed in claim 4, wherein a ratio $H_{int}/H_{ext}$ of a height $H_{int}$ of an internal wall of the elbow and a height $H_{ext}$ of the external wall of the elbow relative to the axis of the gas flow, at the maximum vertical deviation, is less than ½.

6. The assembly as claimed in claim 5, wherein a ratio $H_{ext}/L_{channel}$ is approximately ⅓.

7. The assembly as claimed in claim 1, wherein the duct comprises successively a first cylindrical duct element, a second duct element, first and second third duct elements, each of the first and second third duct elements open into a first half-nozzle and a second half-nozzle, respectively.

8. The assembly as claimed in claim 7, wherein a main propulsion gas flow is divided into a first and a second flow for an ejection into the first and the second half-nozzle, and the assembly further comprises at least one of the following two controlling means: a means of distributing the main flow into each of the two half-nozzles and a means of orienting the thrust vector produced by each of the two half-nozzles.

9. The assembly as claimed in claim 8, wherein said two means are fluid injection or mechanical.

10. The assembly as claimed claim 7, wherein said half-nozzles are placed for a yaw orientation of the thrust vector.

11. The assembly as claimed in claim 7, wherein said half-nozzles are placed for a pitch control.

12. The assembly as claimed in claim 8, further comprising first and second pairs of fluid injectors, the first pair for yaw orientation, and the second pair for pitch orientation.

13. The assembly as claimed in claim 8, wherein the means for controlling the distribution of the flows comprises means for fluid injection at the throat of each of the first and second half-nozzles.

14. The assembly as claimed in claim 9, wherein the gas generator is a turbojet, and the fluid injection means are supplied by air tapped from a compressor of the generator.

15. A method of operating the exhaust assembly as claimed in claim 14 comprising tapping air continuously from the compressor of the generator.

16. The assembly as claimed in claim 7, wherein the main flow is generated by two gas generators, and the assembly further comprises a means of orienting a thrust vector produced by each of the first and second two half-nozzles.

17. A turbomachine comprising an exhaust assembly as claimed in claim 1.

18. The assembly as claimed in claim 14, wherein the fluid injection means includes a first fluid injector disposed on a wall at a throat and a second fluid injector disposed on a wall of divergence.

* * * * *

UNITED STATES PATENT AND TRADEMARK OFFICE
CERTIFICATE OF CORRECTION

PATENT NO. : 7,784,284 B2
APPLICATION NO. : 11/741338
DATED : August 31, 2010
INVENTOR(S) : Edgar Brunet et al.

It is certified that error appears in the above-identified patent and that said Letters Patent is hereby corrected as shown below:

Column 4, line 64, change "$H_{int}/H_{ext} \geq \frac{1}{2}$;" to --$H_{int}/H_{ext} \geq \frac{1}{2}$;--.

Signed and Sealed this

Twenty-third Day of November, 2010

David J. Kappos
*Director of the United States Patent and Trademark Office*